(12) United States Patent
Lee

(10) Patent No.: US 8,229,645 B2
(45) Date of Patent: Jul. 24, 2012

(54) AUTOMATIC PARKING SYSTEM FOR VEHICLE

(75) Inventor: Jong Ho Lee, Seongnam-Si (KR)

(73) Assignee: Hyundai Motor Company, Seoul (KR)

( * ) Notice: Subject to any disclaimer, the term of this patent is extended or adjusted under 35 U.S.C. 154(b) by 838 days.

(21) Appl. No.: 12/326,350

(22) Filed: Dec. 2, 2008

(65) Prior Publication Data

US 2009/0157260 A1 Jun. 18, 2009

(30) Foreign Application Priority Data

Dec. 12, 2007 (KR) .................. 10-2007-0129290

(51) Int. Cl.
*B60T 7/12* (2006.01)
*G08G 1/017* (2006.01)

(52) U.S. Cl. ........................... 701/96; 340/937
(58) Field of Classification Search .......... 701/28, 701/95, 96, 216, 36; 340/426.24, 426.25, 340/436, 937, 938, 943, 932.2, 426.23, 933
See application file for complete search history.

(56) References Cited

U.S. PATENT DOCUMENTS

| 2005/0203686 A1* | 9/2005 | Maier et al. ...................... 701/36 |
| 2005/0236201 A1* | 10/2005 | Spannheimer et al. ....... 180/204 |
| 2006/0220910 A1* | 10/2006 | Becker et al. .............. 340/932.2 |

FOREIGN PATENT DOCUMENTS

KR 10-2007-0062163 A 6/2007

OTHER PUBLICATIONS

"Decisional Architectures for Motion Autonomy", Christian Laugier and Thierry Fraichard, Jul. 10, 2005.*
"Bezier Curves", Paul Bourke, Dec. 1996.*

* cited by examiner

*Primary Examiner* — James Trammell
*Assistant Examiner* — Muhammad Shafi
(74) *Attorney, Agent, or Firm* — Edwards Wildman Palmer LLP; Peter F. Corless (57) ABSTRACT

Disclosed herein is an automatic parking system for a vehicle. The automatic parking system employs a method of generating a parking trajectory in consideration of the operational performance of a steering motor connected to the steering wheel of a vehicle, thus guiding a vehicle through smooth parking and reducing an error between an ideal parking trajectory and an actual parking trajectory.

11 Claims, 6 Drawing Sheets

FIG. 1

PRIOR ART

AUTOMATIC PARKING SYSTEM FOR VEHICLE

CROSS-REFERENCE TO RELATED APPLICATIONS

This application claims under 35 U.S.C. §119(a) priority to Korean Application No. 10-2007-0129290, filed on Dec. 12, 2007, the disclosure of which is incorporated herein by reference in its entirety.

BACKGROUND

1. Technical Field

The present invention relates generally to an automatic parking system for a vehicle, which is capable of parking a vehicle at an accurate location.

2. Related Art

An automatic parking system assists a driver in parking his or her vehicle conveniently and accurately. In general, when parking a vehicle, a driver considers the locations of one or more obstacles on the rear part of the vehicle, which can be detected by sensors (e.g., visual sensors) equipped with the vehicle, and selects an appropriate parking mode (e.g., parallel parking or perpendicular parking), and an automatic parking system performs a predetermined operation accordingly.

Figure 1:
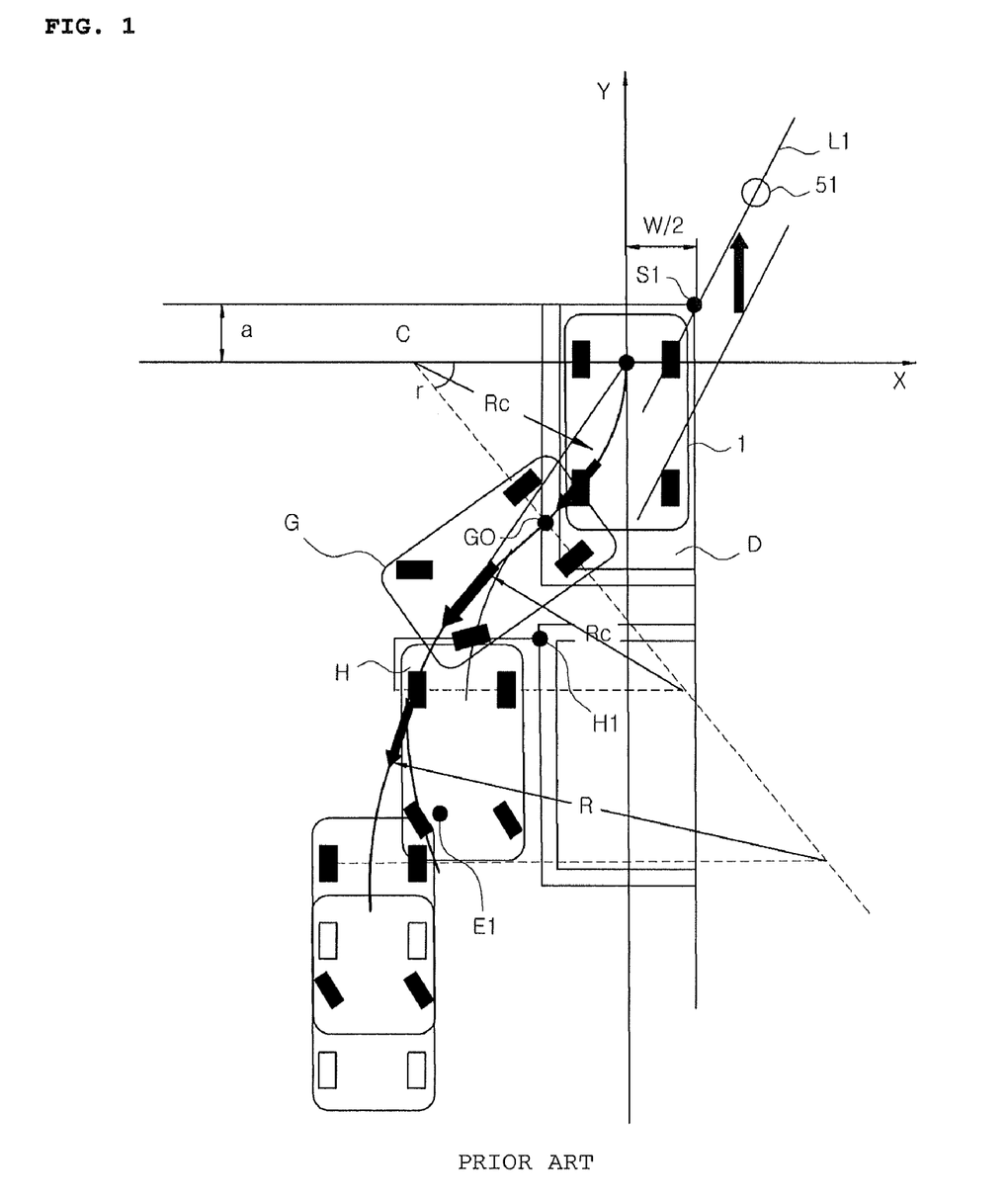
FIG. 1 is a diagram showing a parking trajectory when parallel parking is performed according to a prior art automatic parking system.

FIG. 1 is a diagram showing a parking trajectory of a prior art automatic parking system.

To parallel park successfully, the vehicle should be parked along a trajectory having a minimum turning radius. As can be seen from FIG. 1, the prior art automatic parking system controls a vehicle so that the vehicle can turn with radius Rc around point C to parallel park within a narrow space.

The prior art automatic parking system calculates a parking trajectory using an equation representing the relation between a circle defining a minimum turning radius on the trajectory and a rectilinear line tangential to the circle. This parking trajectory is continuous, but steering angles are applied to respective turning radii in the form of stepped constant values.

Figure 2A:
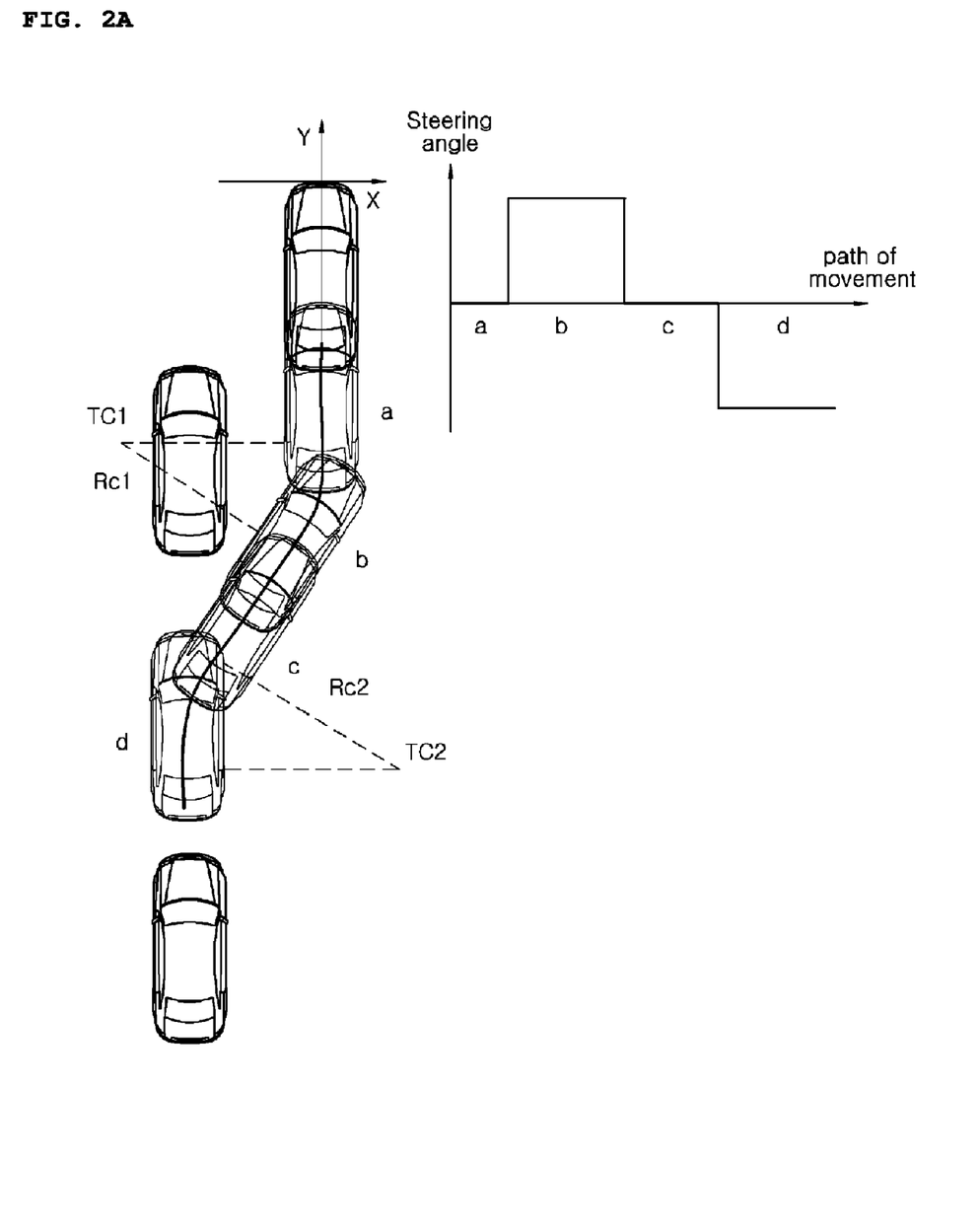
FIG. 2A is a diagram showing an ideal steering angle profile based on a parking trajectory.
Figure 2B:
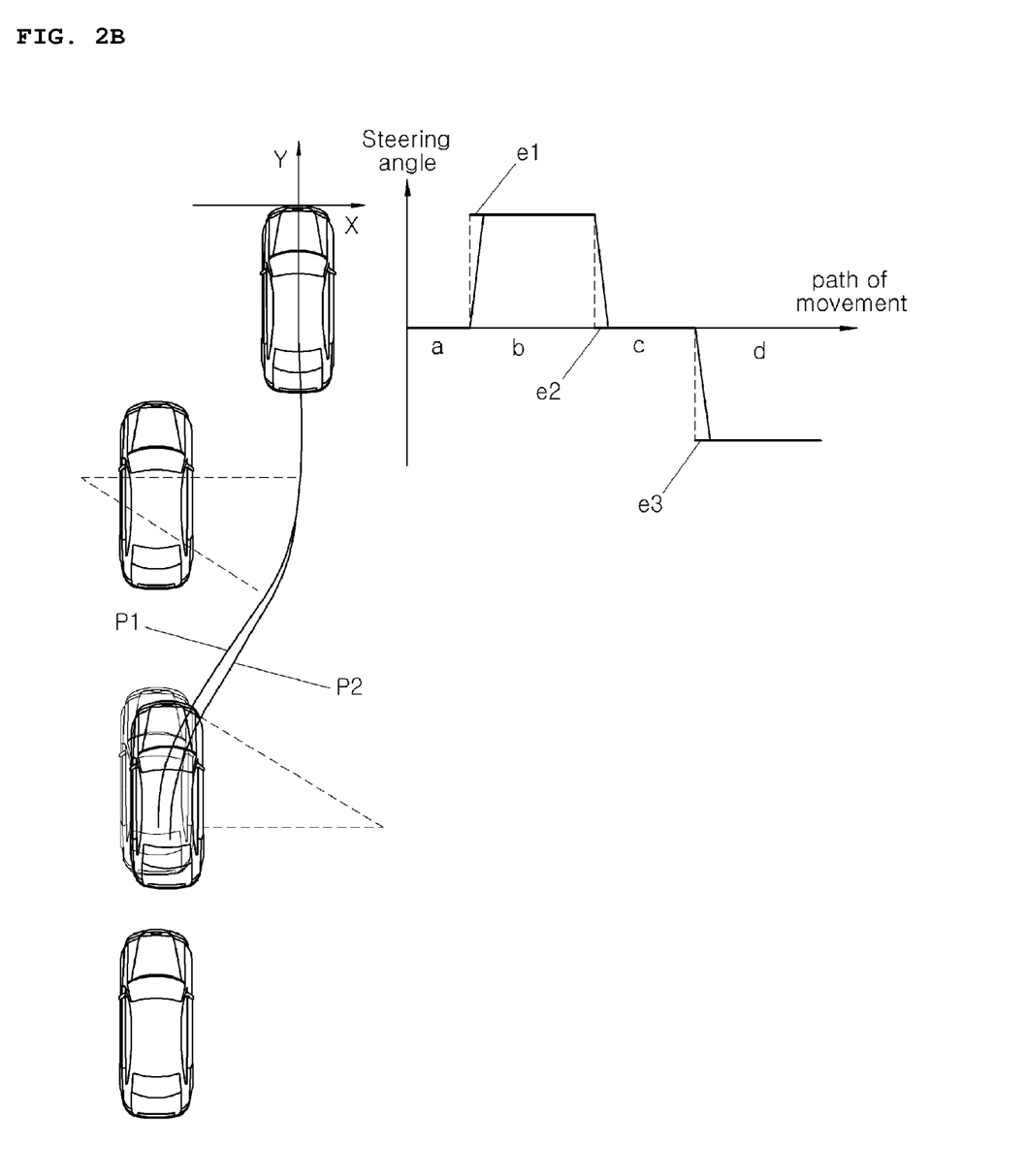
FIG. 2B is a diagram showing an actual steering angle profile based on a parking trajectory.

FIG. 2A is a diagram showing an ideal steering angle profile based on a parking trajectory, and FIG. 2B is a diagram showing an actual steering angle profile.

In the case of an ideal parking system such as that shown in FIG. 2A, in order to enable parking trajectories in respective stages (stages a, b, c and d) to form a continuous parking trajectory during parallel parking, a steering motor for moving a steering wheel generates a square wave operating signal. However, as shown in FIG. 2B, there is a problem in that an actual motor-type steering motor for assisting automatic parking is difficult to generate square waveforms, unlike an ideal steering motor.

Accordingly, due to the limitations on the performance of the motor, there are error regions e1, e2 and e3, in which square wave operating signals are generated. In turn, due to these error regions, a vehicle cannot be parked along a desired trajectory accurately.

Here, reference characters shown in the diagrams will be described in brief, as follows:
   a: straight interval without steering angle,
   b: initial entry interval using minimum turning radius,
   c: rectilinear interval connecting intervals b and d to each other (tangent line between two circles),
   d: final entry interval using minimum turning radius,
   TC1, TC2: centers of rotation,
   Rc1, Rc2: turning radii for centers of rotation,
   e1, e2, e3: quantities of error occurred due to limitations on motor performance,
   P1: ideal parking trajectory which is calculated using the tangent line of circle-rectilinear line-circle, and
   P2: parking trajectory which includes tracking error occurred due to limitations on motor performance.

Figure 3:
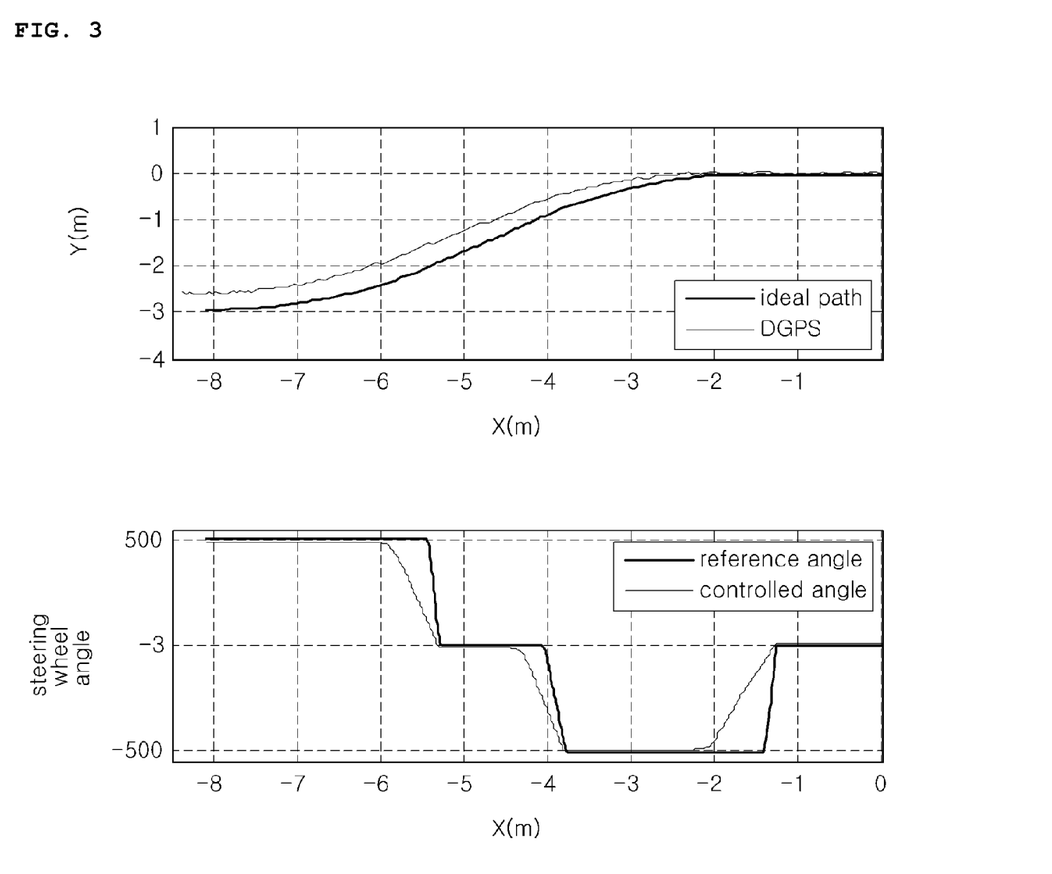
FIG. 3 shows graphs comparing displacements of vehicle movements and steering angles of the ideal and actual parking systems of FIGS. 2A and 2B.

FIG. 3 shows graphs comparing displacements of vehicle movements and vehicle steering angles of the ideal automatic parking system of FIG. 2A and the actual automatic parking system of FIG. 2B.

Referring to FIG. 3, in the ideal automatic parking system, a vehicle first starts at point (0 m, 0 m) and finally arrives at point (−8 m, −3 m) in a rectangular coordinate system. On the other hand, in the actual automatic parking system, the vehicle first starts at point (0 m, 0 m) and finally arrives at point (−8 m, −2.5 m). This indicates that the above-described error causes the vehicle to move 0.5 m in Y-axis less than that of the ideal parking system.

In order to overcome the problem, a method using empirical inclined steering angles based on a trial and error scheme instead of the stepped constant values was proposed. However, this empirical method has a problem in that it causes significant variations in error depending on the speed of a vehicle during parallel parking.

The above information disclosed in this Background section is only for enhancement of understanding of the background of the invention and therefore it may contain information that does not form the prior art that is already known in this country to a person of ordinary skill in the art.

SUMMARY

Accordingly, the present invention has been made keeping in mind the above problems occurring in the prior art, and an object of the present invention is to provide an automatic parking system that is capable of generating a parking trajectory in consideration of the operational performance of a steering motor.

In order to accomplish the above object, one aspect of the present invention provides an automatic parking system for a vehicle, including one or more sensor units for detecting the location information of a vehicle; a control unit for calculating steering angles by generating a trajectory equation and using the location information from the sensor unit or units and, generating control command signals on the basis of the calculation; and a driving unit including a motor unit configured to perform forward rotation or reverse rotation at a predetermined angle or angles in response to the command signals from the control unit, and a gear unit engaged with the shaft of the motor unit at a predetermined gear ratio and configured to generate predetermined rotation moment; wherein the control unit generates the trajectory equation with a plurality of polynomial curves.

The plurality of polynomial curves may be expressed by the following equation:

$$P(u) = \sum_{k=0}^{n} P_k Ploycurve_{k,n}(u), 0 \le u \le 1, n = 4$$

where $$Polycurve_{k,n}(u) = \frac{n!}{k!(n-k)!} u^k (1-u)^{n-k},$$

k is an index of a control point for a single polynomial curve, n is the maximum number of control points, and $p_k$ is the control point.

Control points of a first polynomial curve are symmetrical to corresponding control points, respectively, of second polynomial curve adjacent to the first polynomial curve with respect to a vertical line passing a control point common in the two adjacent polynomial curves.

The plurality of polynomial curves may include a first polynomial curve that comprises control points for converting neutral steering angles into a constant steering angle for a minimum turning radius and a second polynomial curve that comprises control points for performing conversion into steering angles for a turning radius such as that of an arc.

In order to form the neutral steering angles, the control points constituting the first polynomial curve are arranged along a rectilinear line at regular intervals. In order to form the steering angle for a turning radius such as that of an arc, the following coordinate relation equation is applied to the control points constituting the second polynomial curve:

$$P_3(x0, y0)$$
$$P_2(x1, y1) = \left( \frac{(4-\cos\theta_1)}{3} R, \frac{(1-\cos\theta_1)(\cos\theta_1 - 3)}{3\sin\theta_1} R \right)$$
$$P_1(x2, y2) = (x1, -y1)$$
$$P_0(x3, y3) = (x0, -y0)$$

where R is a turning radius, and $\theta_1$ is an angular value that is obtained by equally dividing an angle between $P_3$ and $P_0$ on an arc that has turning radius R and passes through $P_3$ and $P_0$.

The sensor units may be visual sensors or sonic sensors.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Reference now should be made to the drawings, in which the same reference numerals are used throughout the different drawings to designate the same or similar components.

An embodiment of the present invention will be described with reference to the accompanying drawings.

Figure 4:
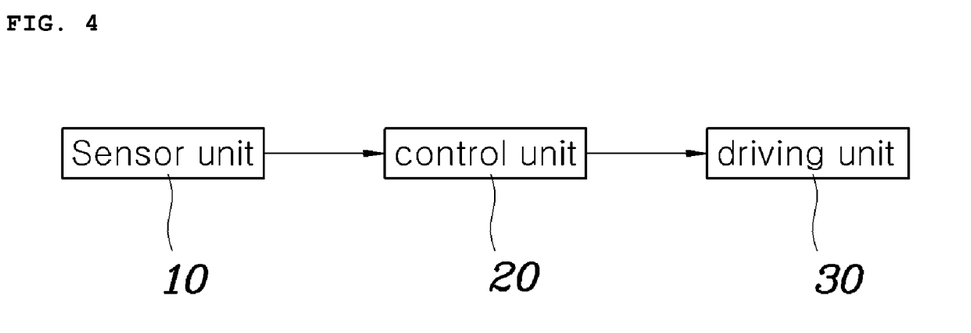
FIG. 4 is a diagram showing the construction of an automatic parking system according to an embodiment of the present invention.

FIG. 4 is a diagram showing the construction of an automatic parking system according to an embodiment of the present invention.

Referring to FIG. 4, the automatic parking system according to an embodiment of the present invention includes one or more sensor units 10, a control unit 20, and a driving unit 30.

The sensor units 10 may be implemented in various ways. For example, it may be implemented by visual sensors such as cameras that can detect one or more objects around a vehicle through one or more captured images. Alternatively, it may be implemented by sonic sensors such as ultrasonic sensors that can detect one or more objects around a vehicle through signals reflected from the objects.

Here, the number and locations of sensor units 10 may vary, and the sensor units 10 may be freely arranged in conformity with the characteristics of a vehicle.

The control unit 20 calculates the angle of the steering wheel of a vehicle and the curvature of an optimum parking trajectory using object information detected by the sensor units 10, and generates a control command signal using the resulting value. Furthermore, the control unit 20 may perform different parking processes according to parking modes selected by the driver. The following description will be given, with focus on the parallel parking mode of a vehicle.

The driving unit 30 performs a predetermined operation in response to the control command signal from the control unit 10. The driving unit 30 includes a motor unit 31 configured to perform forward rotation or reverse rotation at a predetermined angle in response to the command signal from the control unit 20 and a gear unit 32 engaged with the shaft of the motor unit 31 at a predetermined gear ratio and configured to generate specific rotation moment.

According to the present embodiment, the control unit 20 creates a parking trajectory equation using a plurality of polynomial curves and applies the parking trajectory equation to the automatic parking system. That is, the method of the present embodiment uses a control scheme based on a mathematical equation to issue practical steering angle control commands in consideration of limitations on the performance of a steering motor, unlike the prior art method using a tangent line between a circle and a rectilinear line. The following Equation 1 shows an example of the polynomial curves according to the present embodiment:

$$P(u) = \sum_{k=0}^{n} P_k Ploycurve_{k,n}(u), 0 \le u \le 1, n = 4 \quad (1)$$

In equation 1, $$Polycurve_{k,n}(u) = \frac{n!}{k!(n-k)!} u^k (1-u)^{n-k},$$

k is the index of a control point for a single polynomial curve, n is the maximum number of control points, and $p_k$ is the control point.

Referring to Equation 1, four control points may form one polynomial curve. The curvature of a trajectory is determined based on the relative locations of the four control points, and the steering angle and yaw angle of a vehicle can be calculated using the curvature of the trajectory.

Figure 5:
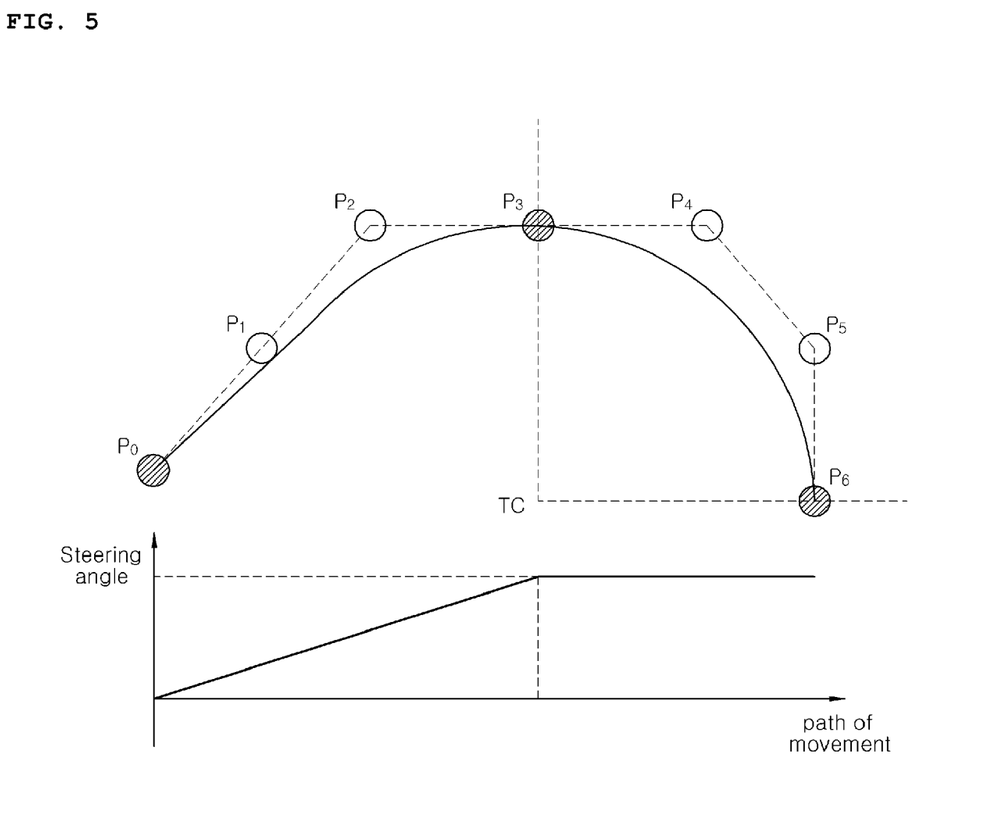
FIG. 5 is a diagram showing a parking trajectory in consideration of the characteristics of a steering motor according to an embodiment of the present invention.

FIG. 5 is a diagram showing a parking trajectory in consideration of the characteristics of a steering motor according to an embodiment of the present invention.

FIG. 5 shows the locations of the control points of two polynomial curves based on a parking trajectory equation created using the two polynomial curves.

The trajectory of a vehicle shown in FIG. 5 consists of a first polynomial curve formed using $P_0$~$P_3$ and a second polynomial curve formed using $P_3$~$P_6$. That is, the first polynomial curve and the second polynomial curve are separate polynomial curves.

The control points $P_0$~$P_3$ are the locations of control points at which neutral steering angles are converted into a constant steering angle for a minimum turning radius, and the control points $P_3$~$P_6$ are the locations of control points at which conversion into a steering angle for a minimum turning radius, such as that of an arc, is performed.

In order to form the neutral steering angle, three control points P0~P2 constituting the first polynomial curve are arranged along a rectilinear line at regular intervals, as shown in FIG. 5. Furthermore, in order to form the steering angle for a turning radius such as that of an arc, a coordinate relation equation, such as the following Equation 2, may be applied to the control points constituting the second polynomial curve:

$$P_3(x0, y0) \quad (2)$$
$$P_2(x1, y1) = \left( \frac{(4 - \cos\theta_1)}{3} R, \frac{(1 - \cos\theta_1)(\cos\theta_1 - 3)}{3\sin\theta_1} R \right)$$
$$P_1(x2, y2) = (x1, -y1)$$
$$P_0(x3, y3) = (x0, -y0)$$

In Equation 2, R is a turning radius, and $\theta_1$ is an angular value that is obtained by equally dividing the angle between $P_3$ and $P_0$ on an arc that has turning radius R and passes through $P_3$ and $P_0$.

In order for the automatic parking system for a vehicle according to the present embodiment to perform a desired operation, the continuity in curvature between trajectories should be ensured. In greater detail, the operation of the motor unit 31 should be continuous, with the result that steering angles created accordingly should have continuity characteristics.

In order to achieve continuity between the separate polynomial curves according to the present embodiment, control points of one polynomial curve should be symmetrical to corresponding control points of the adjacent polynomial curve with respect to a vertical line passing a control point common in the two polynomial curves. For example, as shown in FIG. 5, $P_1$ and $P_2$ should be symmetrical to $P_5$ and $P_4$, respectively, with respect to the vertical line passing $P_3$. If the above condition is satisfied, the polynomial curves can be continuously connected to each other, and thus steering angles can have continuity.

A graph on the lower portion of FIG. 5 shows variation in steering angle along the path of movement of a vehicle. That is, the steering angle of the vehicle gradually increases along the first polynomial curve, and the steering angle is maintained at a constant angle along the second polynomial curve. This means that a circular trajectory is formed with the constant steering angle generated with the result of the trajectory according to the first polynomial curve.

As described above, the control unit 20 generates control points for polynomial curves, calculates steering angles for the control points, and then controls the movement of a vehicle. Thereafter, the driving unit 30 performs a steering operation based on the calculated steering angles.

Figure 6:
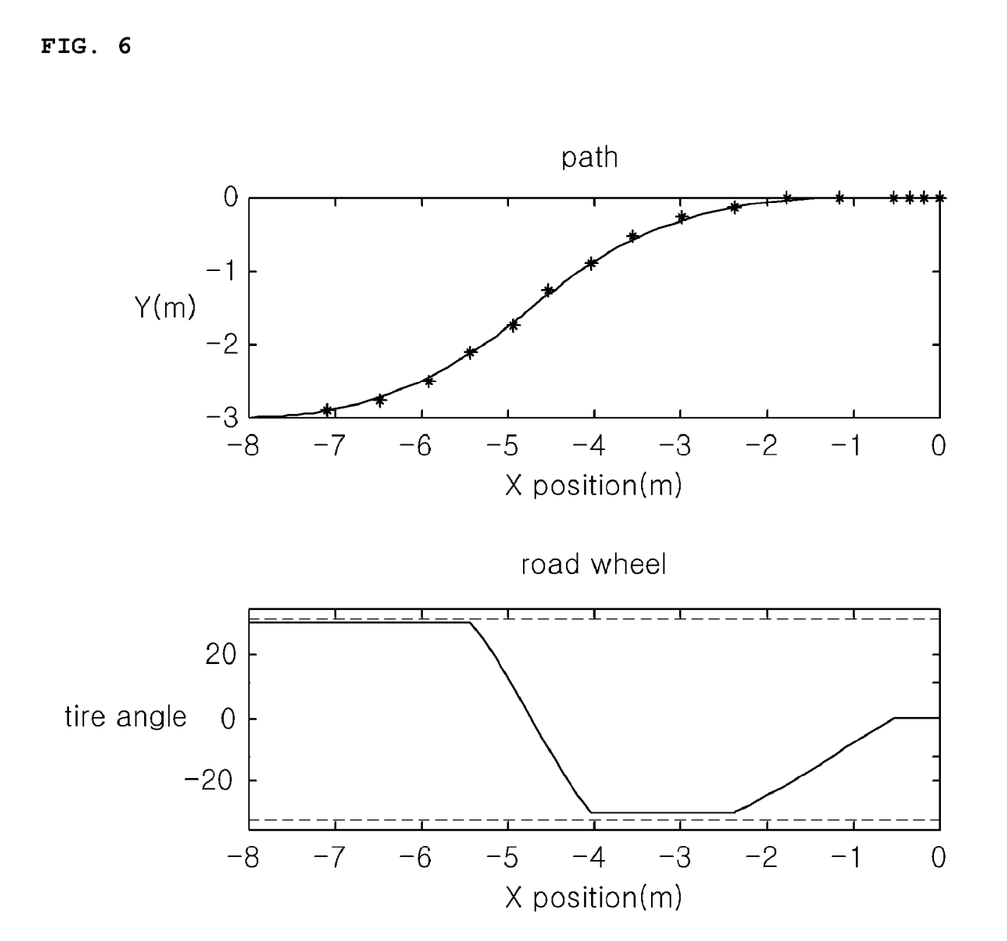
FIG. 6 shows graphs showing the displacements of vehicle movement and steering angles according to an embodiment of the present invention.

FIG. 6 shows graphs showing the displacements of movement and steering angles of a vehicle according to an embodiment of the present invention.

A target parking location was set to a point (−8 m, −3 m). An automatic parking system calculated the path of movement of a vehicle using the trajectory equation. As shown in FIG. 6, the calculation results show that the parking system moved the vehicle −3 m along the y axis and −8 m along the x axis (which is indicated by asterisks on a graph) accurately. Furthermore, the steering angles were shown not in the form of an ideal square wave signal but in the form of continuous variation depending on the characteristics of the motor unit 31.

Although the above-described embodiments of the present invention have been described, with focus on parallel parking, the technical spirit of the present invention is not limited thereto. That is, since the system of the present invention is a system capable of automatically performing the parking of a vehicle, the same system is applied to all parking modes (for example, straight forward parking during perpendicular parking, backward parking during perpendicular parking, and parallel parking), but is not limited to a specific mode.

The automatic parking systems according to the present invention have the advantages of guiding a vehicle through smooth parking and reducing the error between a predetermined ideal trajectory and an actual parking trajectory.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:
1. An automatic parking system for a vehicle, comprising:
   one or more sensor units configured to detect location information of a vehicle;
   a control unit configured to calculate steering angles by generating a trajectory equation and using the location information from the sensor unit or units and, generating control command signals on the basis of the calculation; and a driving unit comprising a motor unit configured to perform forward rotation or reverse rotation at one or more predetermined angles in response to the command signals from the control unit, and a gear unit engaged with a shaft of the motor unit at a predetermined gear ratio and configured to generate a predetermined rotation moment;

wherein the control unit generates the trajectory equation based on a plurality of polynomial curves applied in consideration of performance limitations of the motor unit.

2. The automatic parking system as set forth in claim 1, wherein the plurality of polynomial curves is expressed by the following equation:

$$P(u) = \sum_{k=0}^{n} P_k Ploycurve_{k,n}(u), \ 0 \le u \le 1, n = 4$$

where $$Polycurve_{k,n}(u) = \frac{n!}{k!(n-k)!}u^k(1-u)^{n-k},$$

k is an index of a control point for a single polynomial curve, n is a maximum number of control points, and $p_k$ is the control point.

3. The automatic parking system as set forth in claim 2, wherein the plurality of polynomial curves comprises a first polynomial curve that comprises control points for converting neutral steering angles into a constant steering angle for a minimum turning radius and a second polynomial curve that comprises control points for performing conversion into steering angles for a turning radius of an arc.

4. The automatic parking system as set forth in claim 1, wherein control points of a first polynomial curve are symmetrical to corresponding control points, respectively, of second polynomial curve adjacent to the first polynomial curve with respect to a vertical line passing a control point common in the two adjacent polynomial curves.

5. The automatic parking system as set forth in claim 4, wherein:

the control points constituting the first polynomial curve are arranged along a rectilinear line at regular intervals in order to form the neutral steering angles; and the following coordinate relation equation is applied to the control points constituting the second polynomial curve in order to form the steering angle for a turning radius of an arc:

$$P_3(x0, y0)$$
$$P_2(x1, y1) = \left(\frac{(4-\cos\theta_1)}{3}R, \frac{(1-\cos\theta_1)(\cos\theta_1-3)}{3\sin\theta_1}R\right)$$
$$P_1(x2, y2) = (x1, -y1)$$
$$P_0(x3, y3) = (x0, -y0)$$

where R is a turning radius, and $\theta_1$ is an angular value that is obtained by equally dividing an angle between $P_3$ and $P_0$ on an arc that has turning radius R and passes through $P_3$ and $P_0$.

6. The automatic parking system as set forth in claim 1, wherein the sensor units are visual sensors or sonic sensors.

7. A method for automatically parking a vehicle, comprising:

detecting, by one or more sensor units location information of a vehicle;

calculating, by a control unit, steering angles by generating a trajectory equation and using the location information from the sensor unit or units and, generating control command signals on the basis of the calculation; and performing by a motor in a drive unit forward rotation or reverse rotation at one or more predetermined angles in response to the command signals from the control unit, generating, by a gear unit, a predetermined rotation moment;

generating, by the control unit, the trajectory equation based on a plurality of polynomial curves applied in consideration of performance limitations of the motor unit.

8. The method as set forth in claim 7, wherein the plurality of polynomial curves is expressed by the following equation:

$$P(u) = \sum_{k=0}^{n} P_k Ploycurve_{k,n}(u), \ 0 \le u \le 1, n = 4$$

where $$Polycurve_{k,n}(u) = \frac{n!}{k!(n-k)!}u^k(1-u)^{n-k},$$

k is an index of a control point for a single polynomial curve, n is a maximum number of control points, and $p_k$ is the control point.

9. The automatic parking system as set forth in claim 8, wherein the plurality of polynomial curves comprises a first polynomial curve that comprises control points for converting neutral steering angles into a constant steering angle for a minimum turning radius and a second polynomial curve that comprises control points for performing conversion into steering angles for a turning radius of an arc.

10. The method as set forth in claim 7, wherein control points of a first polynomial curve are symmetrical to corresponding control points, respectively, of second polynomial curve adjacent to the first polynomial curve with respect to a vertical line passing a control point common in the two adjacent polynomial curves.

11. The method as set forth in claim 10, wherein:

the control points constituting the first polynomial curve are arranged along a rectilinear line at regular intervals in order to form the neutral steering angles; and the following coordinate relation equation is applied to the control points constituting the second polynomial curve in order to form the steering angle for a turning radius of an arc:

$$P_3(x0, y0)$$
$$P_2(x1, y1) = \left(\frac{(4-\cos\theta_1)}{3}R, \frac{(1-\cos\theta_1)(\cos\theta_1-3)}{3\sin\theta_1}R\right)$$
$$P_1(x2, y2) = (x1, -y1)$$
$$P_0(x3, y3) = (x0, -y0)$$

where R is a turning radius, and $\theta_1$ is an angular value that is obtained by equally dividing an angle between $P_3$ and $P_0$ on an arc that has turning radius R and passes through $P_3$ and $P_0$.

* * * * *